United States Patent [19]
Badger et al.

[11] Patent Number: 5,493,681
[45] Date of Patent: Feb. 20, 1996

[54] METHOD OF CONFIGURING ALTERNATIVE INSTANCES OF AN ELEMENT CLASS IN A SOFTWARE SYSTEM

[75] Inventors: Wayne H. Badger, Champaign; Mark D. Bellon, Urbana, both of Ill.; M. David Fields, Redmond, Wash.; Brian A. Redding, Champaign; David A. Willcox, Urbana, both of Ill.

[73] Assignee: Motorola, Inc., Schaumburg, Ill.

[21] Appl. No.: 224,945

[22] Filed: Apr. 8, 1994

[51] Int. Cl.⁶ .................................................. G06F 9/06
[52] U.S. Cl. ................................ 395/700; 364/DIG. 1
[58] Field of Search ........................................ 395/700

[56] References Cited

U.S. PATENT DOCUMENTS 5,341,478  8/1994  Travis, Jr. et al. ................ 395/700 X Primary Examiner—Thomas M. Heckler
Attorney, Agent, or Firm—S. Kevin Pickens

[57] ABSTRACT

Alternative instances of an element class are configured in a software system. In one instance, called a single element instance, the software system is configured to support a single element of a class of existing hardware/software elements, called an element class. In another instance, called a multiple element instance, the software system is configured to support multiple elements of the element class. For example, the single element instance might utilize only a single central processing unit (CPU), whereas the multiple element instance allows for several different CPUs to be utilized.

7 Claims, 4 Drawing Sheets

CLASS GENERIC GROUP

| CLASS GENERIC FUNCTIONS |
| :--- |
| • |
| • |

*FIG. 3*

```
) CALL FUNCTIONA
```

*FIG. 4*

CLASS ELEMENT1 GROUP

| ELEMENT1_FUNCTIONA |
| :--- |
| ELEMENT1_FUNCTIONB |
| ELEMENT1_FUNCTIONC |
| • |
| • |

CLASS ELEMENT2 GROUP

| ELEMENT2_FUNCTIONA |
| :--- |
| ELEMENT2_FUNCTIONB |
| ELEMENT2_FUNCTIONC |
| • |
| • |

•
•

CLASS ELEMENTN GROUP

| ELEMENTN_FUNCTIONA |
| :--- |
| ELEMENTN_FUNCTIONB |
| ELEMENTN_FUNCTIONC |
| • |
| • |

*FIG. 5*

CLASS SWITCH GROUP

| FUNCTIONA |
| :--- |
| FUNCTIONB |
| FUNCTIONC |
| • |
| • |

METHOD OF CONFIGURING ALTERNATIVE INSTANCES OF AN ELEMENT CLASS IN A SOFTWARE SYSTEM

TECHNICAL FIELD

This invention relates generally to software systems and, more particularly, to configuration of software systems.

BACKGROUND OF THE INVENTION

A typical software system is made up of a collection of software modules provided together to perform one or more services. In many cases, such a system is designed to run on a particular underlying hardware or software element, such as a specific central processing unit or a specific operating system. Some of the functions provided by the software system are element dependent. That is, each of these functions must be implemented as an element specific routine which runs only with the particular underlying element. The system may also be designed to support multiple such elements in a same element class. For example, a CPU class would contain several different CPUs or CPU versions. Each element dependent function would be separately implemented for the several different CPUs as several correspondingly different element specific routines.

A software system may be required in some cases to run on a single underlying element in the class, but in other cases to support multiple elements in the class, as described above. This may also be the case for a number of different classes (eg. a CPU class, an operating system class, etc.). For each class, the software system must then be written to include all possible implementations of each element dependent function corresponding to all possible elements. The system must also perform some processing to determine the correct implementations of each element dependent function. Unfortunately, this requires a significant amount of memory to store the element specific routines for all the possible implementations. Furthermore, a significant amount of execution time is required to determine the correct implementations. Thus, a more efficient method is desirable for configuring a software system to run on different elements.

BRIEF DESCRIPTION OF THE DRAWINGS

FIG. 3 is an illustration of a class generic group of functions that are not element dependent.

FIG. 4 is an illustration of a function call to an element dependent function.

FIG. 5 is an illustration of a set of class element groups of element dependent functions for a set of elements in an element class.

FIG. 6 is an illustration of a class switch group of switch functions.

DESCRIPTION OF THE PREFERRED EMBODIMENTS

In a preferred embodiment of the present invention, a method and system are provided for configuring alternative instances of an element class in a software system. In one instance, called a single element instance, the software system is configured to support a single element of a class of existing hardware/software elements, called herein an element class or, simply, a class. In another instance, called a multiple element instance, the software system is configured to support multiple elements of the element class. For example, the single element instance might utilize only a single central processing unit (CPU), whereas the multiple element instance allows for several different CPUs to be utilized.

The alternative instance executed depends on the configuration requested by a user, an operator, a program or so forth. Where support for multiple elements in the class is requested, the multiple element instance is executed. The multiple element instance includes all possible implementations of each element dependent function in the class. The multiple element instance also includes routines which determine which element in each class is operational, and then determine the corresponding implementations of all element dependent functions in the class. Thus, maximum flexibility is provided by the multiple element instance in the ability to support multiple different elements that may potentially be requested.

Where only a single element from a class is requested, the single element instance is executed. The single element instance includes only the implementations of each element dependent function necessary for the single requested element. Thus, much of the overhead required by a multiple element system is avoided. Memory is saved that would otherwise be required to store the other possible implementations for elements other than the requested single element. Further, execution time is saved that would otherwise be required in determining the correct implementation of each element dependent function. When the single element instance is executed, the routines that embody these implementations and perform these determinations do not need to be stored in memory, but instead can simply be stored on a storage media such as disk. In this way, the routines remain available for configuration when a multiple element instance is requested.

Figure 1:
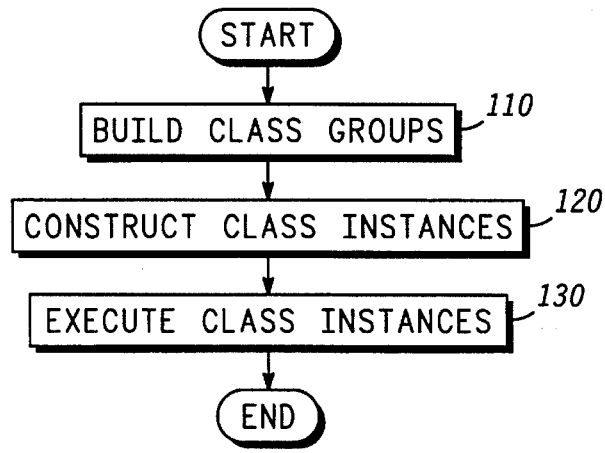
FIG. 1 is a flow diagram of the overall process of configuring and executing alternative instances in an element class.

The overall process of configuring and executing the alternative instances is shown if FIG. 1. In an embodiment of the invention the process of FIG. 1 is performed by a computer which includes the CPU(s) and memory discussed above. For example, the process is performed by software executing on the UNIX(R) SYSTEM V/88 operating system, as is discussed below, which executes on a Motorola MC88100 processor. In step 110, this process builds a set of class groups for all of the functions in each class in the software system. The software system may include various classes of underlying hardware or software elements. For example, a CPU class may be included which includes different CPUs or CPU versions as elements, such as the MC88100 and MC88110 multiple microprocessors and an operating system class may also be included which includes different operating systems or operating system versions as elements, such as different versions of the UNIX(R) SYSTEM V/88 (TM).

Figure 2:
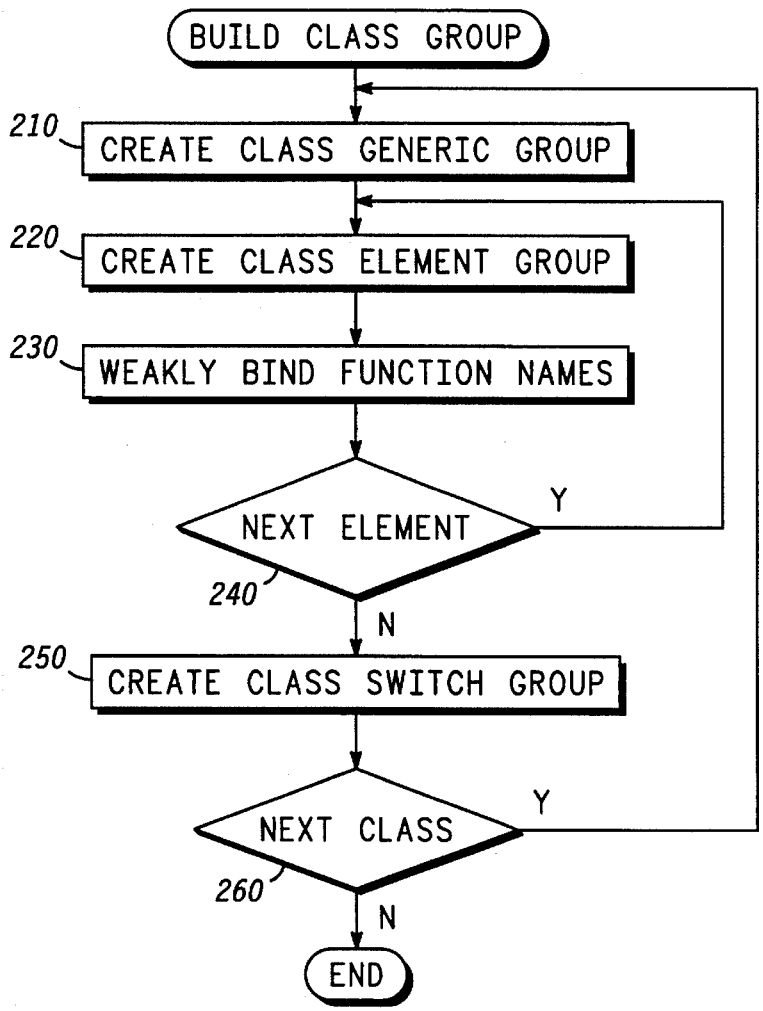
FIG. 2 is a flow diagram of the process of building a set of class groups for each element class.

The process of building the class groups is illustrated in more detail with reference to the flow diagram in FIG. 2. For each class, a class generic group is created in step 210, as shown in FIG. 3. The class generic group comprises all functions in the class that are not element dependent functions. In step 220, a class element group is created for each element in the class. The class element group contains an element specific routine for each element dependent function in the class. The element specific routine implements the element dependent function specific to that element.

Each element specific routine is referenced by a function name that is "weakly bound" in step 220 to the function name called during execution of the software system. That is, when the function name is called during execution the element specific routine having the weakly bound name is invoked only when no other routine exists within the executing software system having the called function name. For example, if the function name called is "functionA", as shown in FIG. 4, and the element specific routine has a name "_functionA" that is weakly bound to "functionA" then the element specific routine is invoked only if no routine exists within the executing software system that is named "functionA". Weak binding is a feature of, for example, UNIX(R)SYSTEM V/88(TM) Release 4.0.

Returning to FIG. 2, it is determined in step 240 whether additional elements exist in the class. Steps 220 through 240 are repeated as long as additional elements are determined to exist in step 240. A class element group has then been created for each element in the class. FIG. 5 illustrates a set of such class element groups created for each element 1 . . . n. It should be noted that the element specific routines in each class correspond by virtue of implementing the same element specific functions for different elements. For example, element1_functionA corresponds to element2_functionA through elementn_functionA, element1_functionB corresponds to element2_functionB through elementn_functionB, and so forth. Each corresponding element specific routine implements a same element dependent function, but implements it differently for each different underlying element.

Returning again to FIG. 2, a class switch group is then created for the class. The class switch group includes a switch routine for each element dependent function in the class. The switch routine determines the underlying element that is operational and calls the element specific routine in the class element group for that element. FIG. 6 illustrates a class switch group. Each switch routine in the class switch group has a function name that is the same as the function name called to implement the function during execution of the software system. Thus, the switch routine in the class switch group is always invoked when the function name is called if the class switch group exists within the executing system. For example, if the function name called is "functionA" and the switch routine has the name "functionA", then the switch routine will be invoked as long as the class switch group is included within the executing system. Returning to FIG. 2, step 260 determines whether additional classes of elements exist within the software system. If so, steps 210–260 are repeated.

Figure 7:
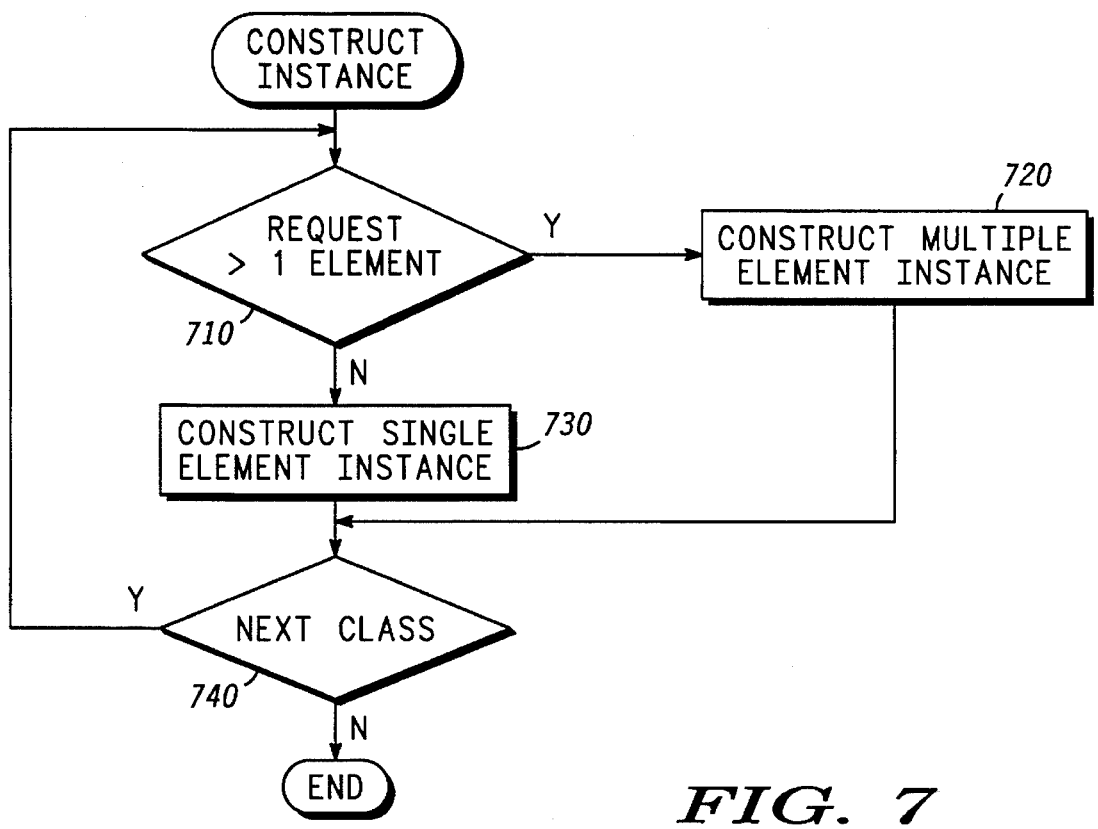
FIG. 7 is a flow diagram of the process of constructing alternative instances of each element class.
Figure 8:
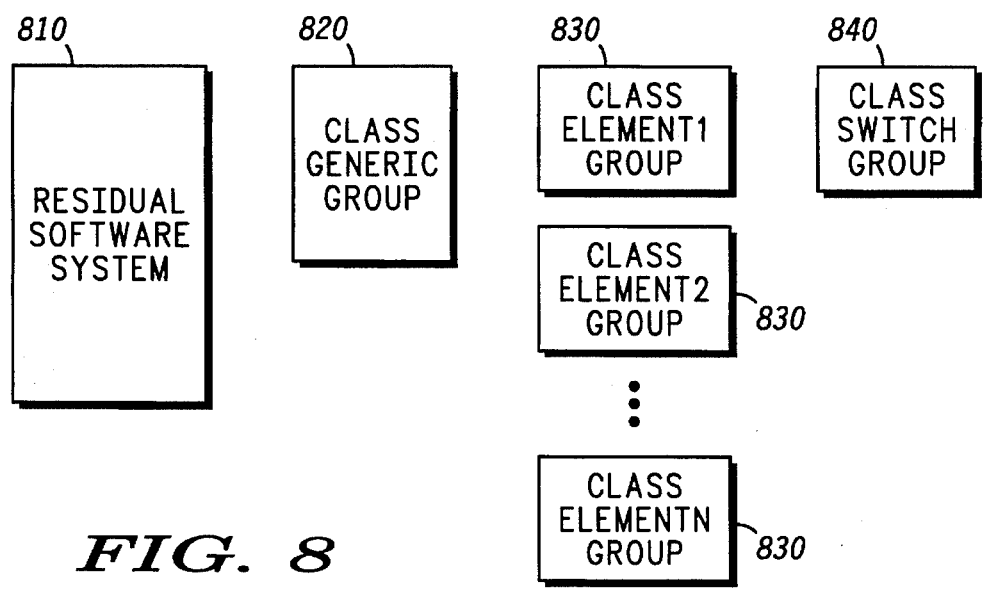
FIG. 8 is an illustration of a set of class groups comprised by a multiple element instance of an element class.

Returning to FIG. 1, once the class groups have been built in step 110 as described above, a set of alternative instances are constructed for each class. The alternative instances are constructed using the class groups created as described above. FIG. 7 is a flow diagram which illustrates the process of constructing the alternative instances for each class. In step 710, it is determined whether more than one element is requested for the relevant class. If so, step 720 is performed wherein a multiple element instance of the class is constructed. The multiple element instance is constructed as shown in FIG. 8. In FIG. 8, the multiple element instance comprises a class generic group 820, the class element groups 830 for all elements in the class, and a class switch group 840 along with the residual software system 810 that is not included in any class group.

Figure 9:
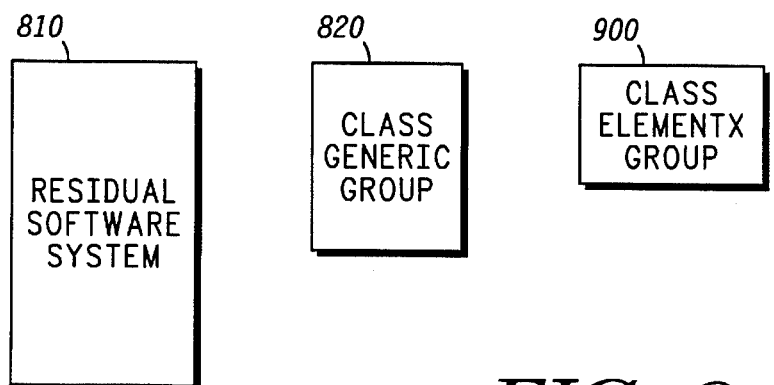
FIG. 9 is an illustration of a set of class groups comprised by a single element instance of an element class.

If in step 710 it is not determined that more than one element is requested, then step 730 constructs a single element instance. The single element instance is constructed as shown in FIG. 9. As shown in FIG. 9, the single element instance comprises the class generic group 820, a single class element group 900 from among the class element groups 830 which corresponds to the single requested element in the class, and the residual software system 810 that is not included in any class group. The single element instance does not include a class switch group or an class element group for any elements other than the single requested element. In step 740, if there are additional classes of elements, then steps 710–740 are repeated for the next class. Otherwise, the process ends.

Returning to FIG. 1, once the instances have been constructed for each class in step 120, the constructed instances are available to be executed in step 130. The preferred method and system described above provides the advantage of a seamless execution of the constructed instance for each class. That is, the element dependent functions are invoked by name in the executing software system regardless of the underlying configuration of elements or whether a single element instance or a multiple element instance is being executed. No changes have to be made at the invocation point of the element dependent functions to obtain the advantage of executing the correct instance.

Figure 10:
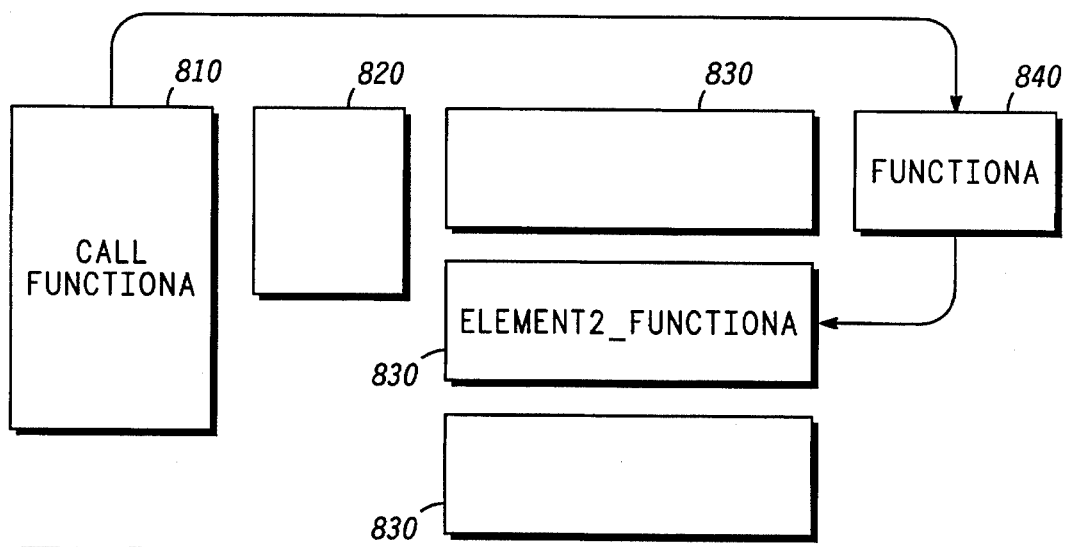
FIG. 10 is diagram illustrating a function call during execution of a multiple element class.

FIG. 10 is a diagram which illustrates the result of a function call in a multiple element instance. When functionA is called, the switch routine named functionA is invoked. The switch routine determines which element is utilized (eg. element2), and invokes the element specific routine in the appropriate class element group (eg. element2_functionA from FIG. 5).

Figure 11:
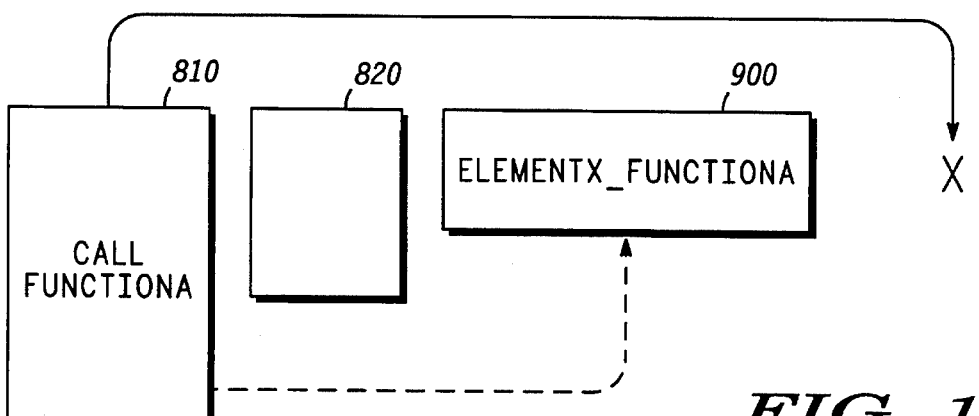
FIG. 11 is a diagram illustrating a function call during execution of a single element class.

FIG. 11 is a diagram which illustrates the result of the same function call in a single element instance. The single element is, for example, element 1. When functionA is called, no routine referenced by that name is found, however, because the class switch group is not included in the single element instance. Thus, the weakly bound name "_functionA" is used instead to invoke, eg., the element dependent function element1_functionA in the class element group for element 1 (of FIG. 5), which is the only class element group in the single element instance.

While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. A method, performed by a computer, of configuring alternative instances of an element class in a software system, the software system capable of executing on different hardware/software elements in the element class and including at least one element-dependent function called by a function name, the method comprising the steps of:

(a) the computer creating a first class element group containing a first element specific routine weakly bound to the function name such that the first element specific routine will be invoked when the function name is called during execution only if no other routine exists within the software system having the function name, and implementing the element dependent function to execute on a first hardware/software element;

(b) the computer creating a second class element group containing a second element-specific routine weakly bound to the function name such that the second element specific routine will be invoked when the function name is called during execution only if no other routine exists within the software system having the function name, and implementing the element dependent function to execute on a second hardware/software element;

(c) the computer creating a class switch group containing a switch routine having the function name by which the element dependent function is called, the class switch routine
 (c1) determining which hardware/software element is operational with the software system,
 (c2) invoking the first element specific routine if the software system is executing on the first hardware/software element, and
 (c3) invoking the second element specific routine if the second hardware/software element is operational;

(d) the computer constructing a single element instance to include the first class element group but not the second class element group when a single element configuration is requested; and (e) the computer constructing a multiple element instance to include the first class element group, the second class element group and the class switch group when a multiple element configuration is requested.

2. The method of claim 1, further comprising the step of
(f) the computer repeating steps (a)–(e) for each of multiple element classes to configure alternative instances of each of the multiple element classes.

3. The method of claim 1, further comprising the steps of
(f) the computer executing, if constructed in step (d), the single element instance and invoking the first element specific routine in the first class element group when the element dependent function is called by the function name, and
(g) the computer executing, if constructed in step (e), the multiple element instance and invoking, when the element dependent function is called using the function name, the switch routine having the function name.

4. The method of claim 3, further comprising the step of
(h) the computer repeating steps (a)–(g) for each of multiple element classes to configure alternative instances of each of the multiple element classes.

5. A method, performed by a computer, of configuring alternative instances of an element class in a software system, the software system capable of executing on different hardware/software elements in the element class and including at least two element-dependent functions, each called by a function name, the method comprising the steps of:

(a) the computer creating a first class element group containing for each element dependent function a first element specific routine weakly bound to the corresponding function name such that the first element specific routine will be invoked when the function name is called during execution only if no other routine exists within the software system having the function name, and implementing the element dependent function to execute on a first hardware/software element;

(b) the computer creating a second class element group containing for each element dependent function a second element specific routine weakly bound to the corresponding function name such that the second element specific routine will be invoked when the function name is called during execution only if no other routine exists within the software system having the function name, and implementing the element dependent function to execute on a second hardware/software element;

(c) the computer creating a class switch group containing a switch routine having each function name by which each element dependent function is called, the class switch routine for each element dependent function
 (c1) determining which hardware/software element is operational with the software system,
 (c2) invoking the first element specific routine if the software system is executing on the first hardware/software element, and
 (c3) invoking the second element specific routine if the second hardware/software element is operational;

(d) the computer constructing a single element instance to include the first class element group but not the second class element group when a single element configuration is requested; and (e) the computer constructing a multiple element instance to include the first class element group, the second class element group and the class switch group when a multiple element configuration is requested.

6. The method of claim 5, further comprising the steps of
(f) the computer executing, if constructed in step (d), the single element instance and invoking the first element specific routine in the first class element group when one of the element dependent functions is called by the function name, and
(g) the computer executing, if constructed in step (e), the multiple element instance and invoking, when one of the element dependent functions is called using the function name, the switch routine having the corresponding function name.

7. A system for configuring alternative instances of an element class in a software system, the software system capable of executing on different hardware/software elements in the element class and including at least one element-dependent function called by a function name, the system comprising:

a computer comprising
 a processor; and
 a memory storing
 (a) a first class element group containing a first element specific routine weakly bound to the function name such that the first element specific routine will be invoked when the function name is called during execution only if no other routine exists within the software system having the function name, the processor implementing the element dependent function to execute on a first hardware/software element by executing the first element specific routine;
 (b) a second class element group containing a second element-specific routine weakly bound to the function name such that the second element specific routine will be invoked when the function name is called during execution only if no other routine exists within the software system having the function name, the processor implementing the element dependent function to execute on a second hardware/software element by executing the second element specific routine;

(c) a class switch group containing a switch routine having the function name by which the element dependent function is called, the processor executing the class switch routine, the class switch routine therefore determining which hardware/software element is operational with the software system, invoking the first element specific routine if the software system is executing on the first hardware/software element, and invoking tile second element specific routine if the second hardware/software element is operational;

(d) a single element instance to include the first class element group but not the second class element group when a single element configuration is requested; and (e) a multiple element instance to include the first class element group, the second class element group and the class switch group when a multiple element configuration is requested.

* * * * *

UNITED STATES PATENT AND TRADEMARK OFFICE
CERTIFICATE OF CORRECTION

PATENT NO. : 5,493,681
DATED : February 20, 1996
INVENTOR(S) : Badger, et al.

It is certified that error appears in the above-indentified patent and that said Letters Patent is hereby corrected as shown below:

In Claim 7(c), column 8, line 2, replace "tile" with -- the --.

Signed and Sealed this

Eighteenth Day of June, 1996

Attest:

BRUCE LEHMAN

*Attesting Officer*  *Commissioner of Patents and Trademarks*